March 14, 1944.  J. A. LAUCK  2,343,912
FLOW EQUALIZER
Filed Jan. 17, 1940  2 Sheets-Sheet 1

Inventor:
John A. Lauck
By: Edward C. Gritzbaugh
Atty.

March 14, 1944.　　　J. A. LAUCK　　　2,343,912

FLOW EQUALIZER

Filed Jan. 17, 1940　　　2 Sheets-Sheet 2

Inventor:
John A. Lauck
By: Edward C. Gritzbaugh
Atty.

Patented Mar. 14, 1944

2,343,912

UNITED STATES PATENT OFFICE 2,343,912

FLOW EQUALIZER

John A. Lauck, Cleveland, Ohio, assignor to Pesco Products Co., a corporation of Ohio Application January 17, 1940, Serial No. 314,209

6 Claims. (Cl. 244—85)

This invention relates to synchronizing arrangements, and more particularly to arrangements for equalizing the flow of fluid to a plurality of remotely located hydraulically operated units under conditions wherein the different units may be subjected to varying resistance opposing the operation thereof.

It is an object of this invention to provide an improved arrangement for synchronizing the movement of a plurality of remotely located fluid pressure operated instrumentalities and more particularly to a metering arrangement for delivering equal quantities of fluid under pressure to two remotely located fluid operated instrumentalities irrespective of the varying resistance to movement offered by the respective ones of said instrumentalities.

A more specific object is the provision of means effective to divide a stream of fluid under pressure into a plurality of separate streams of predetermined fractional quantities delivering the same to two remotely located fluid operated instrumentalities and maintaining this fractional relationship of flow to each instrumentality irrespective of variations in the resistances to flow occurring in the respective streams.

It is a further object of the present invention to provide in combination with a fluid stream divider for delivering fluid pressure to a plurality of remotely located fluid motors subject to varying resistances, said divider having as one of its characteristics a variation in the volumetric capacity thereof with variations in the resistances to flow in the outlet lines therefrom, means which is responsive to a relative rise of pressure in one of said outlet lines effective to increase the resistance to flow in a line of lower pressure whereby to bring the pressure therein up to the pressure existing in said line of higher pressure, thereby causing said divider to always operate at its maximum efficiency and said motors to be synchronized irrespective of varying resistances encountered thereby.

Another more specific object is the provision of a synchronizing arrangement for effecting duplication of movement of a pair of remotely located fluid piston motors operating aircraft landing flaps, wing tip floats, landing gear and other units that must be operated simultaneously and in close synchronism.

Further and more specific objects, advantages, and uses of my invention will become apparent from a reading of the following detailed specification taken in connection with the drawings forming a part thereof and wherein:

Fig. 4 is a section substantially on line 4—4 of Fig. 3.

Figure 1:
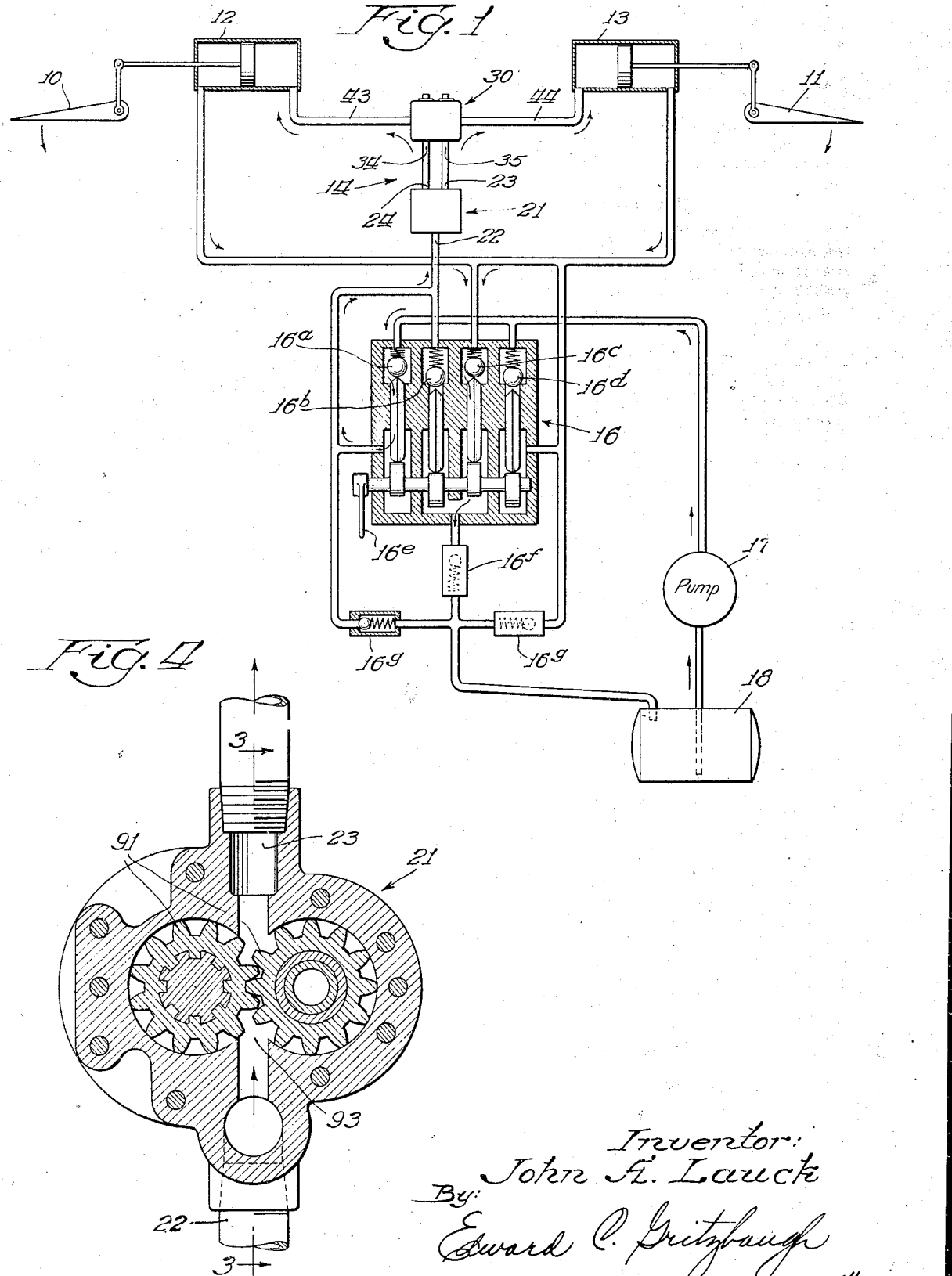
Fig. 1 is a schematic layout of an assembly incorporating the preferred embodiment of my invention.

Referring in greater detail to Fig. 1 for a general understanding of my invention, I have illustrated the same as applied to the problem of synchronizing or duplicating the movement of two remotely located airplane landing flaps 10 and 11. It will be readily appreciated that it is of utmost importance that these landing flaps have identical movement since otherwise the equilibrium of the air craft with which they are associated would be seriously interfered with. As is well known, landing flaps 10 and 11 normally form a pivotal section located in the rear portion of each wing (in the case of a monoplane) and are separated by the main body of the plane, thus making the use of mechanical linkage for synchronizing the arcuate movement of these flaps impracticable. As a solution to this problem, heretofore a gear type divider similar to that disclosed in Figures 3 and 4 has been employed to divide a fluid stream under pressure delivering the two component parts thereof to two separate piston type of motors associated with the respective landing flaps.

I have observed that synchronism is not obtained by such an arrangement and have discovered the reason to be the fact that the volumetric efficiency of the gear type of divider varies with variations in the resistance to which the respective flaps are subjected. This variation in resistance may be due to several causes including differences in the pressure of the air streams to which the respective flaps are subjected, this condition being referred to in the art as a difference in air loading.

I have discovered that by providing an arrangement of means for imposing the same pressure in each of the outlet conduits from the gear divider that the volumetric efficiency of each side of the gear divider becomes the same and consequently the same identical volume is transmitted to each piston motor irrespective of the variation in the resistance to movement encountered by the respective pistons. The novel arrangement of means which I have provided and disclose for accomplishing this result in combination with the gear divider is shown more clearly in Figures 2 and 3 and will be later described in detail.

Figure 2:
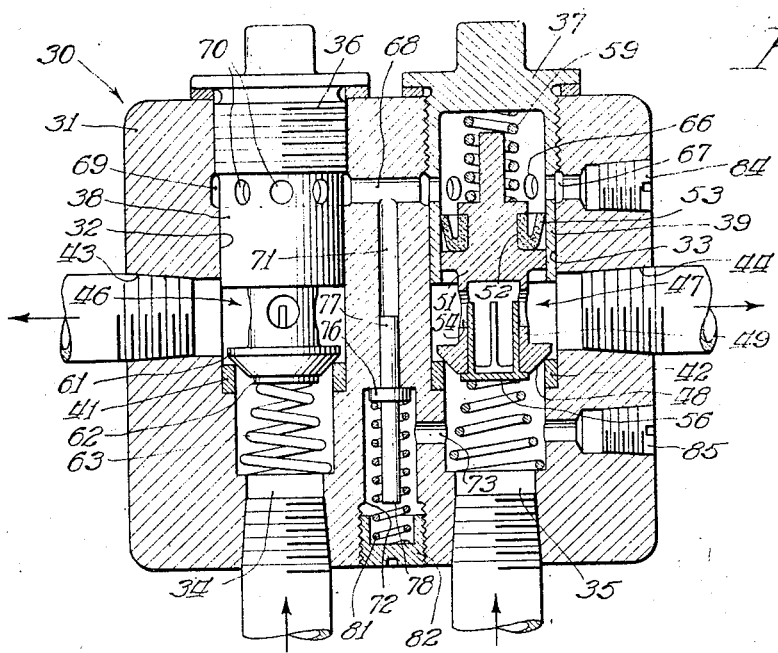
Fig. 2 is an enlarged cross-section view indicating the relation of elements comprising my valve equalizer assembly.
Figure 3:
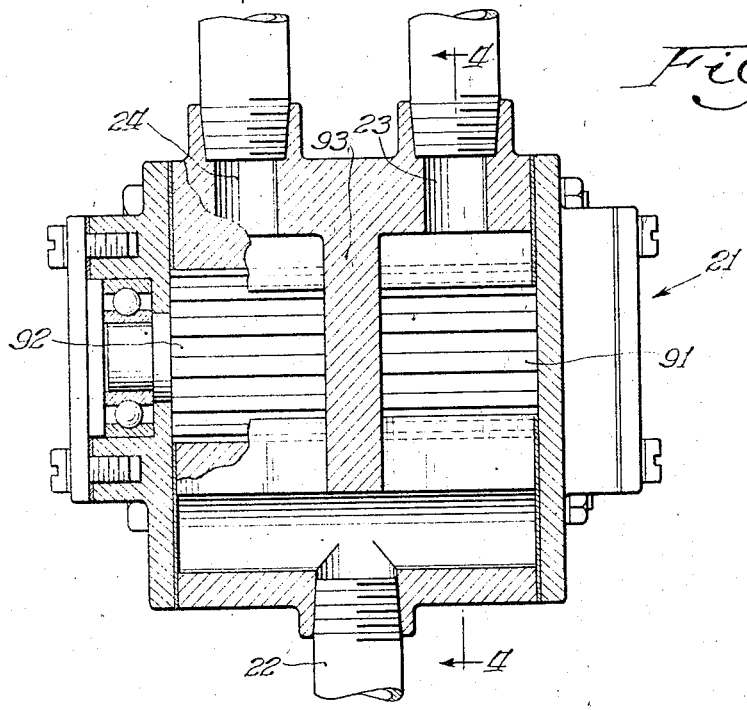
Fig. 3 is a cross-section view of a gear type fluid stream divider with which the equalizer valve mechanism of Fig. 2 is particularly adapted to cooperate, this figure being taken substantially on the line 3—3 of Fig. 4.

While the structure of Figure 2 has particular application in combination with the fluid stream divider of Figure 3, it is to be understood that the same has a broader application to any arrangement wherein it is desired to maintain equal pressures at two corresponding points in separate pressure lines. Likewise it is to be understood that while I have disclosed my invention as applied to the operation of aircraft landing flaps because of its particular importance in this connection, I also contemplate the use of my invention in similar relations such for example as applied to the operation of wing tip floats, landing gear and other units which must be actuated simultaneously.

Generally speaking, the preferred embodiment of an assembly incorporating my improved fluid stream divider is indicated in Figure 1 as comprising landing flaps 10 and 11 operated by piston type motors 12 and 13 respectively, supplied with identical quantities of operating liquid on the forward or adjacent sides of the piston by means of my improved fluid stream divider assembly indicated generally at 14 in turn supplied with fluid under pressure through control valve assembly 16 from pressure pump 17 in turn in communication with fluid supply tank 18. With the valve assembly 16 in the position indicated in Fig. 1, valve 16a and 16c being held open by their associated cams, fluid will be delivered from pump 17 through assembly 14 and to the respective motors 12 and 13 in identical quantities irrespective of the different resistances offered by flaps 10 and 11. When cam operator 16e is moved to a second position to close valves 16a and 16c and open valves 16b and 16d, then pump 17 will deliver fluid to the back side of the pistons and cause fluid to reverse its flow through assembly 14 and back through valve assembly 16 to tank 18. One way check valves 16f functions to maintain the necessary back pressure for maintaining the pistons in a particular adjusted position, while similar check valves 16g function relief valves against excess pressure.

Referring now in further detail to the construction of assembly 14, Figures 2 and 3, by virtue of which identical volumes of fluid are conducted to the adjacent ends of fluid piston motors 12 and 13, equalizer assembly 14 includes a gear type fluid stream divider indicated generally at 21 having a single inlet 22 for receiving a fluid stream under pressure and a plurality of outlets 23 and 24 separated from the inlet by pairs of meshing gears effective, in combination with a pressure equalizer assembly indicated generally at 30, effective to equally divide the main inlet fluid stream and conduct the same through the outlets 23 and 24 leading from the gear divider to the pressure equalizer.

The function of pressure regulator 30 is to maintain the pressure at outlets 23 and 24 of gear divider 21 the same, in order to cause the two sides thereof to operate at the same volumetric efficiency. Pressure equalizer 30 preferably comprises a single housing 31 of generally rectangular cross-section formed with transverse bores 32 and 33 terminating at their lower ends in threaded inlet openings 34 and 35 threadably receiving in their other ends closure plugs 36 and 37 having depending tubular skirts 38 and 39 adapted to function as cylinders for the reception of the piston portions of a pair of valves in a manner that will appear hereinafter. Interposed between the inlet openings and the tubular skirts 38 and 39 are a pair of valve seats 41 and 42. A pair of outlet passages 43 and 44 communicate with bores 32 and 33 between the ends of skirt members 38, 39 and valve seats 41 and 42.

A special arrangement of valves and operating means therefor indicated generally at 46 and 47 are provided for controlling the flow past seats 41 and 42. Since these structures are identical only valve assembly 47 need be described in detail. This includes a disc-like type of valve proper 48 arranged to be received on seat 42 and having a tubular stem portion 49 extending from the rear face thereof and terminating in a piston-like portion 51 received with a very small clearance within cylindrical skirt 33. Valve stem 49 beyond piston 51 is reduced in size at 52 and receives a flexible seal having an upturned outer peripheral portion 53 which as will appear, permits the flow of fluid thereby in one direction, but prevents flow in the opposite direction. Valve stem 49 is formed with a plurality of orifices 54 through the wall thereof in communication with outlet opening 44 on one side and with the inside of a return valve 56 operating with the central orificed lower portion of valve 48 providing for return flow. Valve 56 is urged into position where disc valve 48 seats on valve seat 42 by means of compression spring 59 engaging the upper reduced end portion 52 of stem 49.

Valve assembly 46 is identical in construction with valve assembly 47 and includes a disc-like valve 61 received on seat 41 and having a return valve 62 received in the lower end thereof and urged in a closed direction by spring 63.

The interiors of tubular skirts 32 and 33 are placed in communication above the upper ends of their respective associated piston members by means of a plurality of radial ports 66 through the wall of skirt 33 communicating with an annular recess 67 thereabout and through passage 68 corresponding annular recess 69 and ports 70 in skirt 38.

It will thus appear that should the pressure of the fluid passing valve 48 increase over the pressure of the fluid passing valve 61 due to any cause whatsoever, such for example as the flaps 11 being in an air stream of greater pressure than that of flaps 10, then this will result in fluid passing through the clearance between piston 51 and skirt 33 and past the wall 53 of the seal, through ports 66, passage 68, and ports 70 in skirt 32 into communication with the seal associated with the upper stem portion of valve assembly 46. Since this seal is constructed in the same manner as the seal associated with the piston 51 of valve assembly 47, the fluid will not be permitted to pass thereby but will force the wall of the seal into sealed relation with skirt wall 38. This will result in valve 61 being forced downwardly into engagement with seats 41 with a pressure exactly equal to the difference between the pressure of the fluid at the outlet 43 and the pressure of the fluid at the outlet 44. This increased drop in pressure across valve 61 in turn results in creating a pressure at the inlet 34 of valve assembly 30 exactly equal to the pressure at inlet 35. With the pressures the same, then the respective sides of the gear divider function with equal volumetric efficiency and the same identical quantities of fluid will be transmitted to the adjacent sides of the piston motors 12 and 13.

The operation of the device under circumstances wherein the pressure in communication with outlet 43 rises above pressure in outlet 44 is just exactly opposite to the above, namely the excess pressure will be transmitted past the piston and seal of valve assembly 46 through passage 68 and into communication with the piston and seal of valve assembly 47 holding valve 48 against the seat 42 with a pressure equal to the differential pressure between outlets 33 and 34.

When a reversal of direction of movement of motors 12 and 13 is desired, cam operator 16e is moved to a position wherein valves 16a and 16c are closed and 16b and 16d are opened and fluid is passed back through equalizer assembly 30, gear divider 21, valve 16b, and valve 16f to tank 18. The degree of compression of the spring associated with valve 16f determines the pressure that must be transmitted to the rear faces of the pistons in order to effect the return movement of the fluid over and above any resistance to movement offered by the flaps.

In order to provide for the readjustment of piston assemblies 46 and 47 following a particular condition of operations, or more specifically, to effect the return of liquid forced above the pistons there is provided a passage 71 in communication with a cylindrical chamber 72 in turn connected with bore 33 through passage 73, its communication being under the control of a valve assembly including a disc-like valve 76 having a stem 77 extending for a considerable distance within passage 71 and a second stem 78 extending into cylindrical bore 72. A spring 81 has one end in engagement with disc valve 76 and the other in engagement with a closure plug 82, the end 78 of valve assembly 74 being spaced from the closure plug to provide a limit stop to the movement of the valve which prevents portion 77 from being completely forced out of passage 71. The clearance between stem portion 77 and passage 71 provides for a limited flow when valve member 76 is forced away from its seat, thus allowing the liquid that has accumulated above the valve to leak back into bore 33 whenever the pressure in said bore drops below the pressure of the liquid which is confined above piston 76. It will be noted that cylindrical bore 72 is in communication with only one of the principal bores, namely, 33.

Closure plug 82 is threadably adjusted in the end of bore 72 for the purpose of varying compression of spring 81. Threaded plugs 84 and 85 serve to close transverse passages in communication with the main bores 32 and 33 resulting originally from the formation of passages 68 and 78 and serving subsequently to provide access thereto for cleaning.

The gear divider shown in Figures 3 and 4 is of a well known type, including a pair of meshing gears 91 and 92 on each side of a partition 93 in communication on the inlet side thereof with common inlet passage 22 and on the outlet side thereof with outlet openings 23 and 24. By virtue of the fact, as shown in Figure 4, that corresponding gears of each pair are keyed to the same shaft, these gears are made to rotate together and hence since they are of the same size, theoretically the same amount of fluid will be discharged from each of the outlet openings 23 and 24. However, as above pointed out, I have found that the volumetric efficiency from the respective sides varies when the outlet pressures are varied and hence I have provided the above described novel arrangement of means for maintaining these outlet pressures the same.

The construction of the gear divider shown in Figure 3 is not herein claimed as my invention other than as considered in combination with my novel pressure equalizing assembly shown in Figure 2 as applied to the synchronous control of remotely located motors 13 and devices 11 operated thereby.

While I have described my invention in connection with one specific embodiment thereof, it is to be understood that this is by way of illustration and not by way of limitation, and the scope of my invention is to be defined by the appended claims which should be construed as broadly as the prior art will permit.

I claim:

1. In an aircraft control assembly including a pair of arcuately adjustable remotely located aircraft landing flaps, duplicate liquid pressure-responsive piston motors for adjusting each of said flaps, means for delivering equal quantities of liquid to each of said piston motors for effecting duplication of adjustment of said flaps irrespective of variations in the air resistance to movement encountered by said respective flaps, said means comprising a housing having a single liquid inlet for receiving a single stream of liquid and a pair of separate outlets for discharging said liquid therefrom in two equally divided streams supplying said respective ones of said piston motors, said housing being formed with a pair of parallel gear unit receiving chambers, each chamber including in turn a pair of overlapping cylindrical bores, gears received in said bores meshing in said overlapping areas, means connecting said gears together for operation in unison, said chambers being in common communication on the inlet side of said gears with said single inlet and in independent communication with said separate outlets on the outlet side of said gears and means in communication with said divided streams responsive to an increase in resistance to flow in the divided stream to one of said piston motors effective to throttle the flow in said other divided stream leading to said other piston motor to thus increase the back pressure on the corresponding pair of said gears in said other stream to the same value as the back pressure on the other pair of said gears in said one of said streams whereby the volumetric efficiencies of said gear units are maintained equal and duplicate quantities of liquid are metered to said respective piston motors for duplicating the arcuate movement of said flaps.

2. In an aircraft control assembly including a pair of arcuately adjustable remotely located aircraft landing flaps, duplicate liquid pressure-responsive piston motors for adjusting each of said flaps, means for delivering equal quantities of liquid under pressure to each of said piston motors for effecting a duplication of adjustment of said flaps irrespective of variations in the air resistance to movement encountered by said respective flaps, said means comprising a housing having a single liquid inlet, means for supplying a single stream of liquid under high pressure to said single liquid inlet, said housing being further provided with a pair of separate outlets for discharging said liquid therefrom in two equally divided pressure streams supplying said respective ones of said piston motors, said housing being formed with a pair of parallel gear unit receiving chambers, each chamber including in turn a pair of overlapping cylindrical bores, gears received in said bores meshing in said overlapping areas, means connecting said gears together for operation in unison, said chambers being in common communication on the inlet side of said gears with said single inlet and in independent communication with said separate outlets on the outlet side of said gears, said high pressure inlet stream being effective to rotate said gear units and means in communication with said divided streams responsive to an increase in resistance to flow in the divided stream leading to one of said piston motors effective to throttle the flow in said other divided stream leading to said other piston motor to thus increase the back pressure on the corresponding pair of said gears in communication wtih said other stream to the same value as the back pressure on the other pair of said gears in said one of said streams whereby the volumetric efficiencies of said gear units are maintained equal and duplicate quantities of liquid are metered to said respective piston motors for duplicating the arcuate movement of said flaps.

3. In an assembly adapted to form part of the control for an aircraft including means defining a pair of remotely located surface sections having means pivotally supporting the same for arcuate adjustment to modify the cooperation of said surface sections with the air stream, liquid pressure-responsive piston motors for arcuately adjusting each of said surface sections, means for delivering accurate quantities of liquid to each of said piston motors for effecting duplication of adjustment of said surface sections irrespective of variations in the air resistance encountered by said respective sections, said means comprising a housing having a single inlet opening for receiving a single stream of liquid, a pair of separate outlets for discharging said liquid in two divided streams, conduit means connecting said respective outlet streams to said piston motors, said housing being formed with a pair of parallel gear unit receiving chambers, each chamber including in turn a pair of overlapping cylindrical bores, gears received in said bores meshing in said overlapping areas, means connecting said gears together for operation in unison, said chambers being in common communication on the inlet side of said gears with said inlet and in independent communication with said separate outlets on the outlet side of said gears and means in communication with said divided streams responsive to an increase in resistance to liquid flow to one of said piston motors caused by a difference in air resistance acting on the corresponding surface section effective to throttle the flow in said other divided stream to said other motor to thus increase the back pressure on the corresponding gears in said other stream to the same value as the back pressure on the corresponding gears in said one of said divided streams whereby the volumetric efficiencies of said gear units are maintained equal and said surface sections are moved in synchronism.

4. In a liquid pressure operated system, including a pair of remotely located liquid pressure-responsive piston motor operated devices subject to differences in load conditions, means providing a liquid supply stream, means for dividing said stream into a pair of streams of equal quantities and delivering the same to said respective piston motors in said equal quantities irrespective of differences in the resistance to operation offered by said respective devices, said means comprising a housing having a single inlet liquid opening for receiving said stream of liquid and a plurality of separate outlets for discharging said liquid in a pair of divided streams, conduits leading from said outlets to said respective piston motors, said housing including means forming a plurality of separate gear receiving chambers, pairs of meshing gears received in each chamber, said chamber-defining means including a partition between each adjacent pair of gears, means connecting said gears together for rotation in unison, said chambers being in common communication on one side with said inlet and each chamber being in independent communication with a different one of said separate outlets, separate valve means disposed in communication with each of said divided streams for controlling the resistance to flow therethrough, and means responsive to a relative rise in pressure in one of said streams leading to one of said piston motors effective to urge said valve in communication with said other outlet towards closed position to thus cause a rise in the pressure in said other outlet stream whereby to maintain the back pressure on each of said pairs of gears the same and thus cause the volumetric efficiencies of each pair of gears to be the same and said devices to have duplicate movement.

5. In a liquid pressure operated system, including a pair of remotely located liquid pressure-responsive piston motor-operated devices subject to differences in the load conditions to which the same are subjected, means providing a high pressure liquid supply stream, means for dividing said high pressure stream into a pair of streams of equal quantities and delivering the same to said respective piston motors in said equal quantities irrespective of differences in the resistances to operation offered by said respective devices due to said differences in loading thereon, said means comprising a housing having a single inlet liquid opening for receiving said stream of high pressure liquid and a plurality of separate outlets for discharging said liquid in a pair of divided streams, conduits leading from said outlets to said respective piston motors, said housing including means forming a plurality of separate gear receiving chambers, pairs of meshing gears received in each chamber, said chamber-defining means including a partition between each adjacent pair of gears, means connecting said gears together for rotation in unison, said chambers being in common communication on one side with said inlet and each chamber being in independent communication with a different one of said separate outlets, said high pressure inlet stream being effective to rotate said gears in said separate chambers, separate valve means disposed in communication with each of said divided streams for controlling the resistance to flow therethrough, and means responsive to a relative rise in pressure in one of said streams leading to one of said piston motors effective to urge said valve in communication with the other of said divided streams towards closed position to thus cause a rise in the back pressure in said other stream whereby to maintain the back pressure on each of said pairs of gears the same and thus cause the volumetric efficiencies of each pair of gears to be the same and said devices to have duplicate movement.

6. The combination with a plurality of remotely located liquid pressure-responsive piston motor-operated devices subject to different load conditions, of means for delivering liquid under pressure to each of said piston motors in such relative quantities as to produce identical movement of said devices irrespective of variations in said load conditions, said means comprising a housing having a single liquid inlet opening for receiving a single stream of liquid and a pair of separate liquid outlets for discharging said liquid in a pair of divided streams, conduit means delivering each of said divided streams to said respective piston motors, said housing including means forming a plurality of separate parallel gear-receiving chambers, pairs of meshing gears received in each chamber, said chamber-defining means including a partition between each adjacent pair of gears, means connecting said gears together for rotation in unison, said chambers being in common communication on one side with said inlet and each chamber being in independent communication with a separate one of said outlets, means defining a pair of cylindrical bores, one end of each of said bores being in communication with a separate one of said outlets, the other end of each of said bores being closed, valve seats positioned between the ends of each of said bores, means forming outlet passages from each of said bores intersecting the same at points between said valve seats and the closed ends of said bores, a separate valve assembly received in each of said bores and each including a disc-like valve for reception on said respective seats, a piston-like portion extending from each of said valves beyond said position of communication with said corresponding outlet port in the direction of said closed ends, a flexible seal associated with each one of said piston-like portions and permitting flow from the under side of said piston into said cylindrical bore therebeyond in the direction of said closed ends, but preventing return flow past said piston, means placing said cylindrical bores in communication with one another beyond said piston-like portions, whereby the occurrence of fluid pressure at one of said outlets above the value of fluid pressure at the other of said outlets is effective to cause a flow of liquid from said outlet of higher pressure past the corresponding piston and seal and into communication with the piston-like portion and seal of the other valve assembly, causing the same to urge said other valve toward its corresponding seat with a pressure equal to the differential pressure between said two outlets whereby to maintain the back pressures on said respective pairs of gears equal with the result that the volumetric efficiencies of said pairs of gears are maintained equal and said devices are operated in synchronism.

JOHN A. LAUCK.